3,578,727
TWO-ROD HOT-MELT ADHESIVES FROM POLY-
EPOXIDES OR POLYURETHANE SYSTEMS
William R. Battersby, Lexington, Robert P. Follett, Lowell,
Timothy D. MacGrandle, Lynn, Conrad Rossitto,
Andover, and Paul Taylor, North Andover, Mass.,
assignors to United Shoe Machinery Corporation, Flem-
ington, N.J.
No Drawing. Continuation-in-part of application Ser. No.
699,357, Jan. 22, 1968. This application July 1, 1968,
Ser. No. 741,266
Int. Cl. C08g 45/12
U.S. Cl. 260—830                                    8 Claims

ABSTRACT OF THE DISCLOSURE

An adhesive or stiffening agent supply comprising at least two flexible slender rods of synthetic polymer resin of different mutually reactive compositions adapted to be melted in predetermined length ratio to supply molten material for mixing to give a curing adhesive or stiffening agent composition for application to a surface.

---

This application is a continuation-in-part of our prior application Ser. No. 699,357, filed Jan. 22, 1968, now abandoned entitled "Two-Rod Hot Melt Thermoplastic Adhesive."

DESCRIPTION OF THE PRIOR ART

Adhesives for forming strong bonds between surfaces are of two general categories, namely, those which are supplied in normally liquid condition usually as solutions in volatile solvents and those which are normally solid but which are applied in molten condition for application to surfaces to be bonded. Bonding with solvent type cements is time consuming because of the necessity to evaporate the solvent. Also the cements are inapplicable in many relations because of the impervious nature of the surfaces to be bonded which traps solvent and prevents the adhesive from hardening. Bonding with hot melt adhesives avoids the delays and inconveniences of solvent adhesive bonding and in many relations provides high speed effective union of surfaces. However, particularly where relatively high temperatures may be involved in the use of the bonded article, the thermoplastic materials of which such hot melt adhesives have been made, tend to soften and to allow creep or failure of the adhesive joint.

Molten resinous materials are also applied as a thin layer to sheet materials such as shoe parts, particularly the toe and counter portions of a shoe upper (see U.S. Patent to Chaplick et al. 3,316,573 issued May 2, 1967) and to collars, cuffs and other parts of garments. When the resinous material cools, the layer becomes stiffly resilient and provide stiffness and shape retention to the sheet material on which it was applied. Here, also, temperature and other conditions arise in which thermoplastic stiffening materials do not provide entirely satisfactory stiffening and shape retention.

It is an object of the present invention to provide stable adhesive supply fusible for application in heat softened condition to form bonds having improved physical properties.

It is a further object of the present invention to provide a stable supply of a stiffening material for application in heat softened condition to provide a stiffening layer having improved shape retention and other physical properties.

To these ends and in accordance with a feature of the present invention, we have provided a stable supply of reactive components for mixing and application in molten condition to surfaces to be bonded or stiffened where the mixture hardens rapidly on cooling to form an initial bond and thereafter cures. Curing most frequently will involve conversion to a more heat resistant condition but curing may involve forming a more solvent-resistant material, a melt viscosity change or other physical or chemical change.

The supply article of the present invention includes at least two flexible rods of substantially uniform cross section and indefinite length, each of the rods comprising a synthetic polymer resin, and the material of one rod interacting when mixed in hot molten condition with the material of the other rod to form a resinous reaction product. By this system, a fluid material may be deposited which will form an initial bond or stiffening layer on cooling to solid state and which may then further react to form a material which is not fusible at temperatures which would melt either rod. The rods for interaction may be separate independently feedable rods or may be adhered together for joint feeding; but, for simplicity, the following description will refer to the species using separate rods.

The rods are fed to heating and melting devices such as that disclosed in the patent to Hans C. Paulsen No. 2,765,768, which issued Oct. 9, 1956.

Where the rods are fed separately to these devices the feeding rates are controlled so that for each unit length of one rod a predetermined length of the second rod is fed. The length of second rod may be the same as or may be greater or less than the length of the first rod; and control of setting time and of the physical properties of the reaction product such as hardness, toughness and the like may be controlled by selection of the relative lengths of each rod fed. But the length of each rod fed is maintained in the selected predetermined ratio to that of the other rod so that the quantity of material melted is also in the desired predetermined ratio in which the molten material from the two rods will interact to form a reaction product having the desired properties.

A wide variety of heat-fusible materials may be used. In general, however, each rod will include a substantial proportion of a thermoplastic synthetic polymer resin to give to the rod the properties which are important to its use in the present relationship. These properties are that the rod is dry, non-tacky, flexible and sufficiently hard to be coiled and to be uncoiled for use as needed without cracking and also is sufficiently stiff to be pushed into an entrance port of a melting device for reduction to a fluid condition.

It is also important that the material of one rod be capable of interaction with the material of the second rod to form a resinous reaction product. It is preferred that the synthetic polymer resin of one rod contain on its polymer chain reactive groups for cooperation with groups present in the second of the rods. The interaction may be a chemical combination of groups of one rod with groups of the second rod; or the groups of one rod may provide a catalytic action on the groups of the second rod to form a heat resistant resinous product; or one rod may contain groups which exert a catalytic action on, as well as groups which react with groups of the second rod. Combinations of any of the above systems may also be employed.

Synthetic polymer resins of many types may be used, such as polyamides, polyesters, polyepoxides, polyurethanes and so on. Polymer resins in which reactive or catalytic groups are easily introduced are particularly useful. For example, polyamide resins may be prepared by known procedures to include primary, secondary or tertiary amine groups along the polymer chain or at the terminals of the polymer chain. Such amine groups may exert catalytic or reactive action on groups joined to the polymer resin of a second rod. In such second rod a polyamide reacted to include, for example, epoxy groups will cooperate with the reactive groups above referred to. Tertiary amine groups on the first rod may catalyze self-condensation of such an epoxy-containing polyamide. Primary amine groups may react with the epoxy groups of the polymer resin of the second rod. In some instances there may also be a reaction between the amide group of one rod and the epoxy group of the other rod.

Other reactive systems may be based on isocyanate, carbodiimide, phenol aldehyde and other known curing type resin system. With the isocyanate based system, for example, one rod may have an —NCO or blocked —NCO containing polymer while the other may have groups such as —OH, —COOH, —NH$_2$ or other groups providing active hydrogen for reaction with the —NCO. Also one rod may comprise catalytic material. Combinations of reactive materials of different systems or types in one or the other of the rods may also be used.

The following examples are given to aid in understanding the invention but it is to be understood that the invention is not restricted to the materials, proportions or conditions disclosed in the examples.

EXAMPLE I

Rod A 1.75 mols of dimer acid and 0.25 mol of azelaic acid were condensed and polymerized with 1.2 mol of ethylene diamine and 0.513 mol of hexamethylene diamine. The resulting acid terminated polyamide was reacted and condensed with 0.4 mol of dimethylaminopropyl amine to form a resin having a melting point of 110° C. and an amine value of 18. The terminal groups of this polyamide were tertiary amines. The material was extruded as a rod of 3/16" cross section.

Rod B 45 parts by weight of polypropylene glycol (molecular weight 2000) and 15 parts by weight of 1,6 hexane diol were reacted and condensed with 36 parts by weight of toluene diisocyanate to form an —NCO terminated prepolymer having an —NCO content of 5%. To this prepolymer there were added 9 parts by weight of glycidyl alcohol and this was reacted at 100° C. to form an epoxy terminated resin having an epoxy equivalent weight of 2900 and essentially no free —NCO groups. The melting point of this material was 85° C. This material was extruded as a 3/16" rod.

These rods were fed to separate melting units at equal rates to supply equal quantities of molten material which were mixed rapidly and applied directly to aluminum surfaces preheated to 425° F. which were pressed together directly on application of the molten material. Directly on cooling a firm bond was established between the surfaces. Curing reaction between the materials of the mixture commenced immediately on mixing of the molten materials and the curing reaction continued even when the assembly was cooled to room temperature. Curing was approximately 60% complete at the end of the first hour. A bond strength in shear of about 1500 lbs. per square inch was obtained after 24 hours; and there was no perceptible cold flow when the assembly was subjected to load at normal use temperatures.

EXAMPLE II

Rod A

Dimer acid and azelaic acid in the molar ratio of 3:1 were reacted and condensed with ethylene diamine and hexamethylene diamine in the molar ratio of 12:1. The acidic components were present in sufficient excess to form carboxyl terminated polyamide. The carboxyl terminated polyamide was reacted with dimethylaminopropyl amine to give an amine terminated polyamide having a melting point of 150° C. and an amine value of 24.

1.5 mols of dimer acid and 0.5 mol of azelaic acid were reacted and condensed with 1.4 mols of ethylene diamine and 0.313 mol of hexamethylene diamine. To the condensation product there were added 0.4 mol of triethylene tetramine and the mixture was further reacted to form a resin having a melting point of 110–120° C. and an amine value of about 50.

90 parts by weight of the first of the above resins was melted and combined with 10 parts by weight of the second of the above resins and the mixture was extruded as a 3/16" rod.

Rod B 2 mols of dimer acid were condensed with one mol of ethylene diamine and 0.3 mol of hexamethylene diamine to form a carboxyl terminated polyamide having a melting point of 98° C. and an acid number of 10. The material was melted and there was added for reaction 280 grams of an epoxy resin (epoxy equivalent weight 195) and 120 grams of an epoxy cresol novolac (ECN 1280) having an average epoxy functionality of about 3.5. Reaction was carried out to an extent to bring the acid number to below one. The molten material was extruded as a 3/16" rod at a temperature of 250° F.

These rods were melted and mixed as in Example I and applied to acid etched surfaces of strips of aluminum to be joined, the aluminum being preheated to 425° F. The strips of aluminum were lightly pressed together immediately after application of the molten mixture. Bond strength after 24 hours was from 3000 to 4000 lbs. per square inch.

For comparison, rod A was melted and applied to acid etched surfaces of strips of aluminum to be joined, the aluminum being preheated to 425° F. and the strips of aluminum were pressed together immediately after application of the molten material. Bond strength after 24 hours was 750 lbs. per square inch.

In a similar test, using rod B, the bond strength after 24 hours was 600 lbs. per square inch.

EXAMPLE III

Rods A and B of Example II were melted and mixed at 350° F. to 400° F. and spread in a layer 0.040 inch in thickness as a stiffener for the counter portion of a shoe upper. At this stage, reaction of the rod materials was not complete and the shoe upper with the stiffener layer was lasted. The layer had sufficient stiffness at this stage to hold the shoe upper in the lasted shape; and the strength, stiffness, creep resistance and heat resistance of the stiffener layer continued to increase as curing progressed after the step of lasting.

EXAMPLE IV

Strips of aluminum to be bonded together were cleaned with solvent and preheated to 425° F. Rods A and B of Example II were melted, mixed and applied directly to the cleaned surface of the aluminum strips and the strips were lightly pressed together immediately after application of the molten mixture.

After 24 hours, the bond strength at room temperature was about 2,200 lbs. per square inch. When the bonded strips were heated to 250° F. the bond strength was 80 lbs. per square inch.

When rod A alone or rod B alone was melted and applied to the aluminum strips for forming a bond, the bonds had no strength at all at 250° F.

EXAMPLE V

Rod A 3.5 mols of terephthalic acid, 4.5 mols of isophthalic acid and 2 mols of sebacic acid were condensed with an excess of 1,4 butane diol to form an OH terminated polyester with an OH number of 30, a melting point of 75 to 100° C. 100 parts of this polyester was reacted with 24 parts of phenol-blocked bis 4-phenylmethylene diisocyanate at a temperature of 350° C. to 400° C. to split off phenol from the isocyanate to allow it to combine with the hydrogens on the hydroxyl terminated groups of the polyester. On cooling, phenol recombined with the residual isocyanate group on the diisocyanate residue so that the ultimate product was a polyester with blocked isocyanate terminal groups. The product had a melting point of 110° C. and was extruded as a 3/16" rod.

Rod B 8.5 parts of terephthalic acid, 27 parts of isophthalic acid, 8 parts of hexahydrophthalic anhydride and 1 part by weight of trimellitic anhydride were condensed and polymerized with 45 parts by weight of 1,4 butane diol. This gave a somewhat branched chain hydroxyl terminated polyester having an OH number of 25 and a melting point of 110 to 120° C.

The rods were supplied to separate melting units and brought to molten condition at a temperature of 375° F. Equal weights of the molten materials were mixed and applied to aluminum strips which had been preheated to 200° F. The strips were pressed together promptly under light pressure and formed a strong bond.

Having thus described our invention, what we claim as new and desire to secure by Letters Patent of the United States is:

1. A progressive supply adhesive two-part system for providing in heat softened condition successive quantities of a resinous mixture reactive to form a cured resinous product not fusible at temperatures effective to melt the unreacted components brought together in said mixture, said system comprising the combination of two flexible slender rods of substantially uniform cross section and indefinite length, each of said rods being dry, and non-tacky at room temperature, with sufficient flexibility to be coiled and thereafter to be uncoiled for use as needed without cracking and being sufficiently stiff to be capable of being pushed into an entrance portion of a melting device for successive reduction by heat to a fluid condition of successive length portions introduced into said device, each of said rods comprising a synthetic polymer resin, a first of said rods containing groups capable of interaction with groups of the polymer resin of the second of said rods to effect curing, said second rod comprising a polyepoxide having at least two terminal epoxide groups and said first rod comprising an amino containing polyamide and the weight of, and quantity of said groups in a unit length of said first rod being in substantially constant ratio to the weight of, and quantity of said groups in a unit length of said second rod, simultaneously advancing feed of said rods to associated melting devices at predetermined relative rates being effective successively to reduce predetermined relative lengths of forward portions of said rods to molten condition, forward portions of said rods being molten and molten portions of said rods being in intimate admixture in relative quantities providing quantities of each of said groups in the mixture needed for reaction to form said cured resinous product.

2. A progressive supply adhesive two-part system as defined in claim 1 in which the polymer of said second rod comprises reactive terminal epoxide groups and the polyamide of said first rod has tertiary amine end groups for catalyzing condensation of said polyepoxide to form a resinous reaction product which is not fusible at temperatures effective to melt the resin of either rod.

3. A progressive supply adhesive two-part system as defined in claim 1 in which the resin of said second rod is the epoxide terminated polymer resin product of combining a carboxylic acid terminated polyamide and an excess of a polyepoxide having at least two terminal epoxide groups per molecule.

4. A progressive supply adhesive two-part system as defined in claim 7 in which said first rod comprises synthetic resinous polyamide having tertiary amine end groups for catalyzing condensation of said epoxide terminated polymer resin.

5. A progressive supply adhesive two-part system as defined in claim 8 in which said first rod comprises synthetic resinous polyamide containing primary amine groups.

6. A progressive supply adhesive two-part system for providing in heat softened condition successive quantities of a resinous mixture reactive to form a cured resinous product not fusible at temperatures effective to melt the unreacted components brought together in said mixture, said system comprising the combination of two flexible slender rods of substantially uniform cross section and indefinite length, each of said rods being dry, and non-tacky at room temperature, with sufficient flexibility to be coiled and thereafter to be uncoiled for use as needed without cracking and being sufficiently stiff to be capable of being pushed into an entrance portion of a melting device for successive length portions introduced into said device, each of said rods comprising a synthetic polymer resin, a first of said rods containing groups capable of interaction with groups of the polymer resin of the second of said rods to effect curing, the polymer resin of said second rod comprising blocked isocyanate terminal groups and the polymer resin of said first rod containing groups having active hydrogen for reaction with isocyanate groups which are unblocked by heat in said hot molten mixture and the weight of and quantity of said groups in a unit length of said first rod being in substantially constant ratio to the weight of, and quantity of said groups in a unit length of said second rod, simultaneously advancing feed of said rods to associated melting devices at predetermined relative rates being effective successively to reduce predetermined relative lengths of forward portions of said rods to molten condition, forward portions of said rods being molten and molten portions of said rods being in intimate admixture in relative quantities providing quantities of each of said groups in the mixture needed for reaction to form said cured resinous product.

7. A progressive supply adhesive two-part system as defined in claim 6 in which said first rod comprises synthetic resinous polyamide containing primary amine groups.

8. A progressive supply adhesive two-part system as defined in claim 6 in which said first rod comprises synthetic resinous polyester containing hydroxyl groups.

References Cited

UNITED STATES PATENTS

| 2,867,592 | 1/1959 | Morris | 260—18 |
|---|---|---|---|
| 2,912,398 | 11/1959 | Johnson | 260—837 |
| 2,940,888 | 6/1960 | Johnson | 260—836 |
| 2,975,150 | 5/1961 | Johnson | 260—837 |
| 3,008,863 | 11/1961 | Johnson | 156—334 |
| 3,249,563 | 5/1966 | Balk | 260—858 |
| 3,440,086 | 4/1969 | Kerns | 260—858 |
| 3,505,261 | 4/1970 | Battersby | 260—837 |

FOREIGN PATENTS

| 1,102,940 | 3/1961 | Germany | 260—837 |

OTHER REFERENCES

Hot Melt Adhesives, K. Wright, Rubber and Plastics age, pp. 514, 516 and 519, 1966.

PAUL LIEBERMAN, Primary Examiner

U.S. Cl. X.R.

260—18, 77.5, 836, 837, 858; 156—218, 330, 334; 161—186